3,035,037
PROCESS FOR THE CONTINUOUS PRODUCTION OF POLYOLEFINES OF UNIFORM MOLECULAR WEIGHT

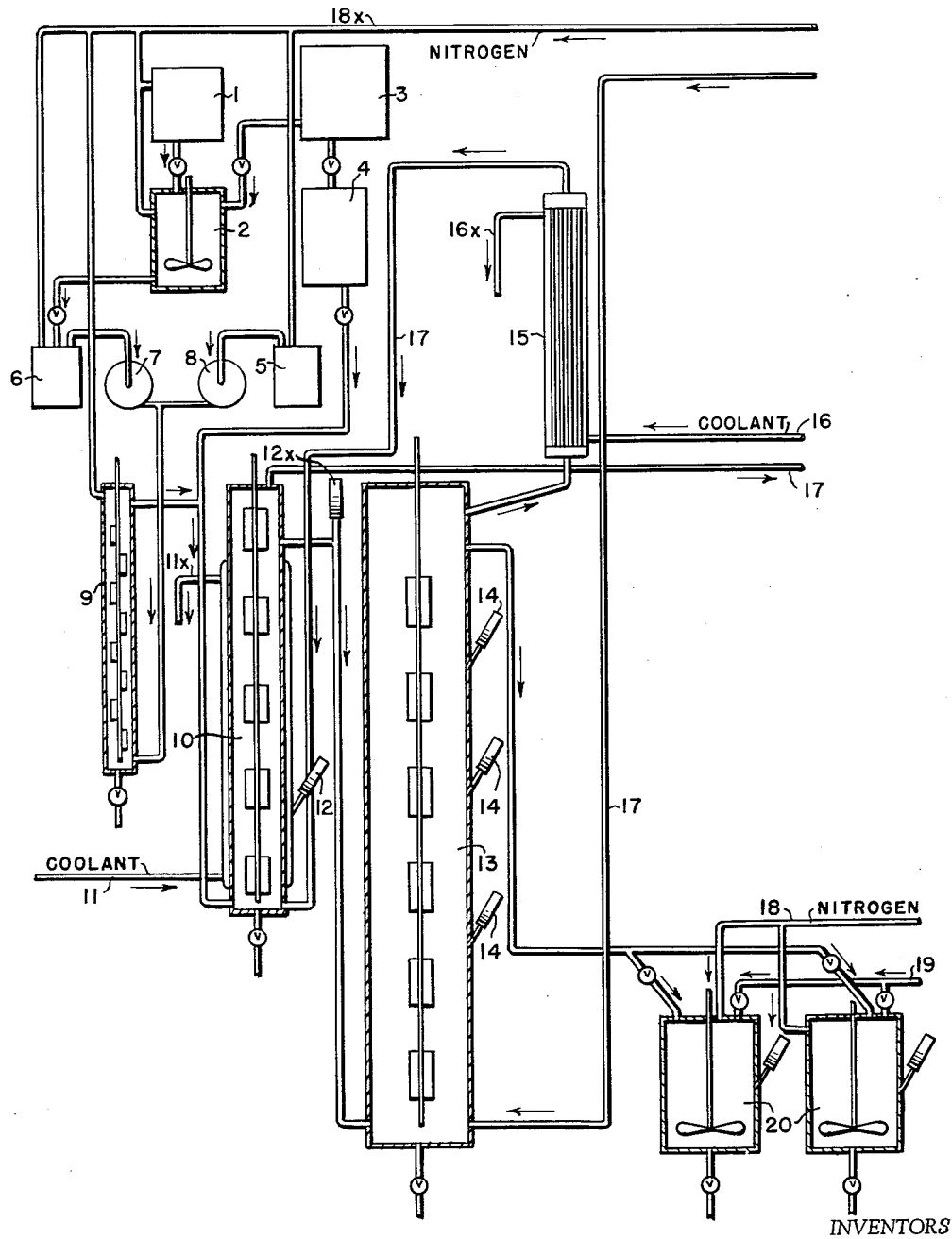

Ernbrecht Rindtorff, Recklinghausen, Karl Schmitt, Herne, Günther Keller, Wanne-Eickel, and Otto Ambros, Mannheim, Germany, assignors to Bergwerksgesellschaft Hibernia Aktiengesellschaft, Horne, Germany
Filed Apr. 13, 1956, Ser. No. 578,077
Claims priority, application Germany Nov. 5, 1955
7 Claims. (Cl. 260—94.9)

It is known to polymerise olefines by the Ziegler process with metal alkyls or other catalyst combinations in the presence of solvents. This process has hitherto always been carried out by effecting polymerisation batchwise. It has however been found that even a product obtained from a single batch does not possess a uniform molecular weight. Even greater variations are shown by polymers which are derived from different batches. Because the melting points and especially the melt viscosities of the individual polymers show considerable differences, there are substantial difficulties in the subsequent working up. These disadvantages are apparently to be attributed to the continuous change in the catalyst relations within a batch because of the consumption of the catalyst and the inclusion of the catalyst in the polymer formed. In order to obtain a uniform polymer it is therefore necessary to maintain uniform catalyst relations in the reactor at every point of time. This is only possible with a continuous process. Such processes hitherto failed because the catalyst continuously introduced into the reactor at the temperature of approximately 80° C. prevailing therein lost its activity, with the consequence that polymers of very low molecular weight were obtained which were brittle and could not be used for further working up.

It has now been found that polyolefines of very uniform molecular weight can be produced continuously in simple manner by first subjecting the catalyst to initial polymerisation in a pre-reactor at a relatively low temperature. The catalyst is gradually heated from the temperature of 20° C. at which it is stirred in to approximately 60° C., so that it can then be brought into the main reactor without loss in activity. The further advantage is obtained that the catalyst has at once reached the stage of its maximum activity and thus is immediately available for the polymerisation in the main reactor. Preferably the procedure is such that the catalyst is introduced continuously from below into the main reactor, while the corresponding quantity of solvent with the polymer suspended therein is withdrawn from the upper part of the reactor. The procedure in the pre-reactor is just the same with the difference that there the temperature is lower and the residence time shorter. After working up the polymer, a product of uniform molecular weight is obtained which is very suitable for further working up.

The desired molecular weight can be varied as desired by varying the catalyst composition. In every individual case the polymers obtained show a great uniformity of properties.

Example

The apparatus consists essentially of three narrow long upright tubes, which differ only in their size and are provided internally with a vertical stirrer shaft carrying stirrer blades. 6 litres per hour of a 0.76% solution of aluminiumdiethyl monochloride in cyclohexane and 28.8 cm.$^3$ titanium tetrachloride are introduced continuously from below into the first tube of approximately 1 litre capacity, corresponding to a molecular proportion of titanium to aluminium as 1:1.5. The mean residence time in the tube is 10 minutes and the temperature is kept at 20° C. The prepared catalyst mixture then flows away from the top and together with about 18 litres of cyclohexane enters from below the second tube of about 4 litres capacity. Ethylene is also introduced into this second tube from below. The temperature in the lower part of the tube is kept at 20° C. and rises slowly in upward direction to 60° C. The mean residence time in this tube is also 10 minutes. The initial polymerised mixture then escapes from the tube again and enters from below into the third tube of about 70 litres' capacity into which ethylene is likewise again introduced from below. The mean residence time in this tube is three hours and the temperature is 80° C. 24 litres per hour of cyclohexane containing about 3.5 kg. of polyethylene of very uniform molecular weight (ca. 50.000) are then withdrawn continuously from the top; the polymer is then worked up in conventional manner. A polymer with a molecular weight of 100.000 can be obtained by choosing a molecular proportion of titanium to aluminium as 1:3.

When using aluminium triethyl instead of aluminium diethyl monochloride as a catalyst, the other conditions of test being the same, the following polymers are obtained:

| molecular proportion, titanium : aluminium | molecular weight of the polymer |
|---|---|
| 1:1.5 | ca. 500.000 |
| 1:1.2 | ca. 400.000 |
| 1:1 | ca. 150.000 |
| 1:0.9 | ca. 100.000 |
| 1:0.8 | ca. 70.000 |

The temperatures in the main reactor are in a certain degree variable. The upper limit is at approximately 80° C.; higher temperatures would cause the destruction of the catalysts. The application of lower temperatures (to 40° C.) is possible, but of little practical value as in these cases it is very difficult to eliminate heat.

The temperature in the pre-reactor is also variable; the interval between the temperatures in the pre-reactor and in the main reactor however should not be more than 25° C. as otherwise the catalyst could suffer damage.

The stirring temperature for the catalyst can also be varied within the limits of 5 and 25° C.

A preferred and practical embodiment of the invention is shown in the accompanying drawing:

The 10% solution of for instance aluminium triethyl in cyclohexane in tank 1 is thinned in tank 2 with cyclohexane from store tank 3 to 0.8% and then comes into store tank 6, from where it comes by way of the dosing pump 7 into the catalyst mixer 9. At the same time a 10% solution of TiCl$_4$ in cyclohexane is given from the store bottle 5 by way of the dosing pump 8 into the catalyst mixer. This mixture is intensively stirred in the catalyst mixer by stirrer blades and after a residence time of 10 minutes it flows from above in the prepolymerisator 10, while at the same time the rest of cyclohexane (75%) is added from the measuring tank 4. Into this pre-reactor the ethylene coming from the main reactor 13 is conducted from below through the pipe line 17. The cooling (pipe lines 11 and 11x) in the pre-reactor is so adjusted, that the temperature at the lower thermometer 12 is about 20–25° C. and at the upper thermometer 12x about 50–60° C. After a residence time of also 10 minutes the product runs out above and comes into the main reactor 13 from below, in which fresh ethylene is conducted from below. In both reactors the product is well stirred by long stirrer blades. The temperature in the main reactor (thermometers 14) is kept at 80° C. Now the ethylene goes above through the brine cooled (pipe lines 16 and 16x) back-flow condenser 15 into the pre-reactor, while the product flows out above into the two washing tanks 20, where it is washed with methanol (pipe line 19). Above the washing tanks and the catalyst store tanks there is a permanent atmosphere of nitrogen (pipe lines 18 and 18x).

What we claim is:

1. Process for the continuous production of polyolefines of uniform molecular weight from ethylene and a catalyst consisting essentially of an aluminum alkyl and a titanium halide, which comprises initially polymerizing a mixture of ethylene and said catalyst in a first polymerization zone at an introductory temperature of 20–25° C. and having progressively higher temperatures along the length thereof the effluent temperature being at least 40° C. and not exceeding about 60° C., and thereafter passing the resultant initial polymer and contained catalyst together with additional ethylene through a second polymerization zone maintained at a temperature not exceeding about 25° higher than the exit temperature from the first zone, the temperature in said second zone not exceeding about 80° C.

2. Process as in claim 1, wherein the temperatures at the entry and exit portions of the first zone are about 20° C. and 60° C. respectively.

3. The process of claim 1, wherein said second polymerizing zone is maintained at about 80° C.

4. The process of continuously producing polyolefines of uniform molecular weight from olefins and a catalyst comprising an aluminum alkyl and a titanium halide, which comprises forming an initial polymer from ethylene and catalyst in a first polymerizing zone progressively increasing in temperature from about 20° C. at the entry thereof to about 60° C. at the exit thereof, for about 10 minutes, and forming a polymer from said initial polymer and contained catalyst and additional ethylene in a second polymerizing zone at about 80° C. for about three hours.

5. The process of claim 1, wherein said catalyst comprises a mixture of aluminum diethyl chloride and titanium tetrachloride.

6. The process of claim 5, wherein the proportion of aluminum alkyl halide to titanium halide is varied, the molecular weight of the resultant polymer increasing with an increase in the proportion of aluminum alkyl halide to titanium halide.

7. The process of claim 1, wherein said catalyst comprises a mixture of aluminum triethyl and titanium tetrachloride.

References Cited in the file of this patent

UNITED STATES PATENTS

| | | |
|---|---|---|
| 2,702,288 | Hoeksema et al. | Feb. 15, 1955 |
| 2,726,231 | Field et al. | Dec. 6, 1955 |
| 2,824,090 | Edwards et al. | Feb. 18, 1958 |
| 2,833,755 | Coover | May 6, 1958 |
| 2,827,447 | Nowlin et al. | Mar. 18, 1958 |
| 2,889,314 | Fritz | June 2, 1959 |

FOREIGN PATENTS

| | | |
|---|---|---|
| 533,362 | Belgium | May 16, 1955 |